J. F. MORELAND.
COTTON CHOPPER.
APPLICATION FILED MAR. 2, 1921.
1,413,760.
Patented Apr. 25, 1922.
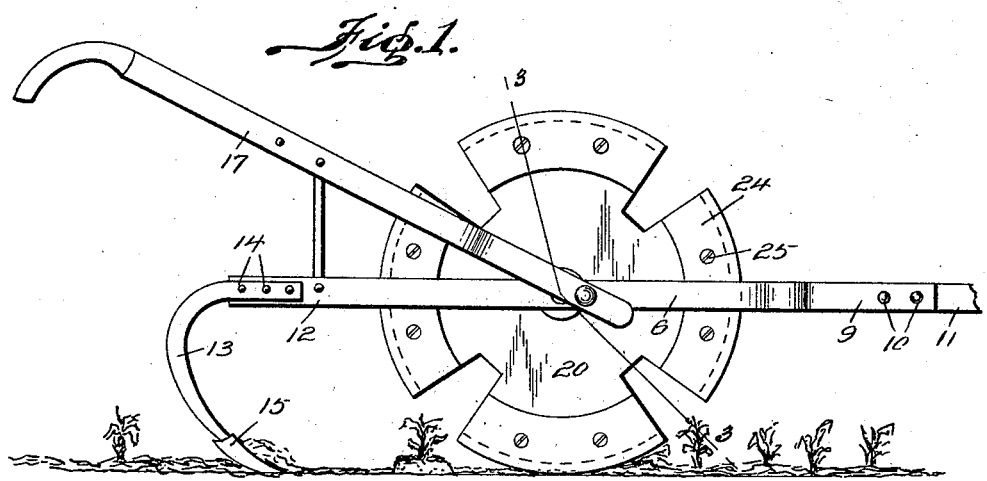
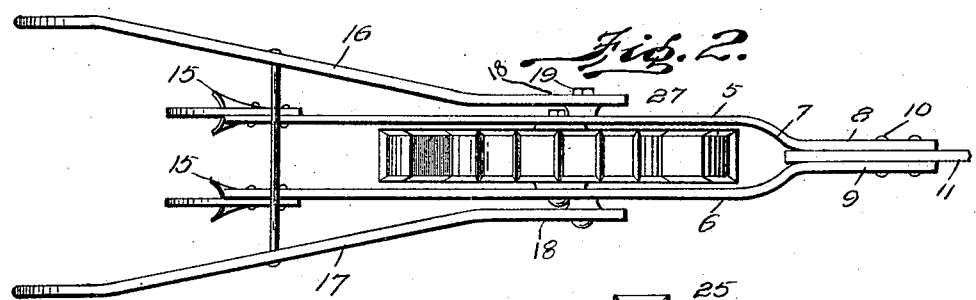
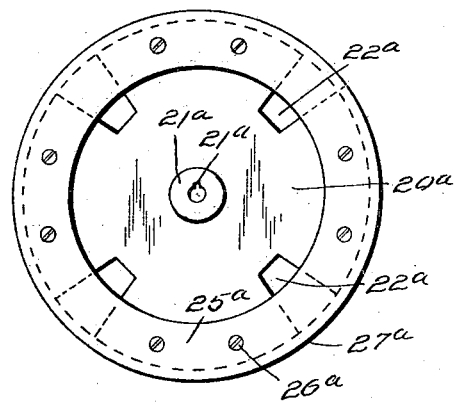
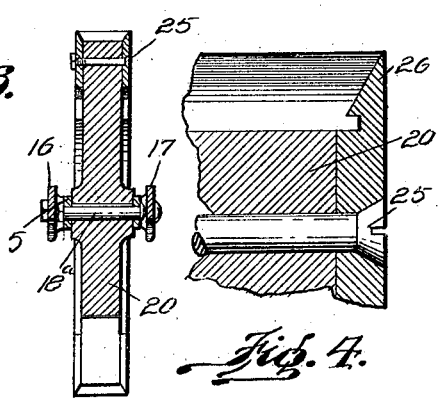
Inventor
J. F. Moreland.
By
Attorney

UNITED STATES PATENT OFFICE.

JOSEPH F. MORELAND, OF LEXINGTON, TEXAS.

COTTON CHOPPER.

1,413,760.　　　　Specification of Letters Patent.　　Patented Apr. 25, 1922.

Application filed March 2, 1921. Serial No. 449,030.

*To all whom it may concern:*

Be it known that I, JOSEPH F. MORELAND, a citizen of the United States, residing at Lexington, in the county of Lee and State of Texas, have invented certain new and useful Improvements in Cotton Choppers, of which the following is a specification.

This invention relates to rotary or revolving cotton choppers, and the primary object of the invention is directed to a new and improved device particularly adapted to block out or chop cotton plants and the like as is common in cotton cultivation.

The primary object of the invention resides in the construction of a cotton chopper or beet blocker of the rotary type wherein a main ground supporting wheel is provided with a plurality of transversely positioned knives or cutters arranged in spaced relation so that upon the forward travel of the device over a row of standing plants, will cut out or chop out certain of the same and leave plants standing at equal distances apart.

Another object of the invention is the construction of a cotton chopper wherein certain of the plants are flattened out and cut into small particles to be subsequently covered by a pair of cultivator blades following the chopper which in addition throws the soil towards the standing plant during the forward movement of the machine.

A still further object of the invention will be found to reside in a cotton chopper of the rotary or revolving type wherein the ground supporting wheel is provided with tapered openings for receiving certain of the plants and in addition with transverse equally spaced cutting blades which are adapted to flatten out and cut up certain of the plants during the forward progress of the machine, said ground supporting wheel being provided with flanged cutting edges on its outer periphery whereby the machine will run true to the row of cotton being cultivated.

A still further and important object of the invention will be found to reside in the novel and improved construction of a cotton chopper or beet blocker which will be extremely simple in design, consisting of comparatively few parts therefor inexpensive to manufacture, positive and efficient in operation, rigid and durable in construction, comparatively light and easily to be manipulated either on hilly or level ground and particularly adapted for use under various conditions of soil.

With these objects in view and others which will be manifest and suggested as the purpose and nature of my invention are revealed in the following specification and drawings wherein I have shown a preferred embodiment thereof, Figure 1 is a side view of the cotton chopper.

Fig. 2 is a plan view thereof.

Fig. 3 is a sectional view through the chopper wheel taken on the line 3—3 of Fig. 1.

Fig. 4 is a detail sectional view showing the method of attaching the side plate of the chopper, and Fig. 5 is a side view of a modified chopper wheel.

Referring now to the drawing wherein like parts designate corresponding parts throughout the specification, 5 and 6 designate the longitudinally extending side bars constituting the frame of the cotton choppers, which bars are curved and inwardly directed at 7 whereby the front parallel extensions 8, 9 may be bolted or otherwise permanently secured at 10 to a draft beam designated 11. The parallel side bars have attached to their rear ends 12 the usual curved plow standards 13 which are fastened as at 14 as clearly shown in Fig. 1 being provided with the usual plows 15 for the obvious purpose.

Of course, both the plow beams and plows are similar in construction and parallel with each other so as to throw the soil freely over the plants that are chopped out and about the plants that remain standing heretofore to be referred to.

The outwardly and rearwardly directed handle bars 16, 17 are preferably attached near their ends 18 to the side bars 5, 6 substantially intermediate their ends, being provided with the usual nut 19. Referring particularly to Fig. 3, it will be seen that the transverse axle 18$^a$ carries a substantially large and wide ground supporting wheel 20 having a hub 21 keyed thereto as at 21$^a$ whereby the said wheel may be mounted and positioned in the manner shown in said figure. The said wheel is provided with a plurality of tapered recesses 22$^a$ equally spaced about the periphery of the wheel whereby certain of the plants will remain standing as the machine travels over a row of plants. Between the respective recesses 22$^a$, I have provided curved plates 24 which are secured to each other in any well known manner by bolts or fastening elements 25, said plates extending somewhat beyond the periphery of the wheel 20 terminating in sharpened flanges or cutting edges 26 which cut into the ground during the travel of the machine and keeps the same in its true course over the row.

Referring to Fig. 2, I have shown a plurality of horizontal, flat cutting plates 27, said cutting plates being equally distant apart and provided with beveled cutting edges whereby the plants are first flattened out and then cut into short pieces before they are covered by the plow elements rearwardly of the wheel. By reason of the tapered openings which are wider at the surface and open at the sides, the same will cause the soil to fall more freely that they might otherwise pick up. The plows, it will be understood, will throw the dirt from both sides of the row completely covering up the cut up portions of the plate and cultivate those plants left standing.

In the form of chopper wheel shown by Fig. 5, the annular plates 25 are positioned on each face of the wheel being secured at 26ª near the outer periphery thereof and also have their sharpened edges 27ª slightly beyond the outer edge of the wheel in the same manner and for the same purpose as above set forth. In this instance the recesses 22ª are between the annular plates and of course leave certain of the plants standing during the forward progress of the chopper wheel.

In the accompanying drawings, I have illustrated my invention embodied in one form by way of example, and which in practice has been found to be highly satisfactory in obtaining the desired results. It will be obvious however that other embodiments may be adopted and that various changes in the details of construction may be resorted to by those skilled in the art without departing from the spirit and scope of the invention. It will be furthermore understood that the invention is not limited or restricted to the precise elements shown except in so far as such limitations are specified in the subject matter being claimed.

Having shown and described my invention, what I now claim as new and desire to secure by Letters Patent of the U. S. is:—

In a combined cultivator and cotton chopper comprising a frame, an enlarged ground supporting wheel rotatably carried intermediate of said frame, said wheel having a plurality of equally spaced, tapered cut out portions in its periphery, curved plates secured to each side of the wheel between the cut out portions and provided with sharp ground engaging flanges thereon whereby the said wheel is maintained in operative position over the row, a plurality of flat, spaced cutting knives secured between the said plates, for depressing and chopping out plants during the forward travel of the machine, and handle bars secured to the sides of the frame substantially intermediate thereof for directing the travel of said chopper and cultivator.

In testimony whereof, I affix my signature hereto.

JOSEPH F. MORELAND.